(12) United States Patent
Besettes et al.

(10) Patent No.: US 10,207,818 B2
(45) Date of Patent: Feb. 19, 2019

(54) METHOD AND SYSTEM FOR DISPLAYING THE EXTERNAL ENVIRONMENT OF AN AIRCRAFT, AND AIRCRAFT DOOR EQUIPPED WITH SUCH A SYSTEM

(71) Applicant: LATECOERE, Toulouse (FR)

(72) Inventors: Cyrille Besettes, Buzet sur Tarn (FR); Laurent Groux, Mons (FR); Christophe Perrier, Toulouse (FR)

(73) Assignee: LATECOERE, Toulouse (FR)

( * ) Notice: Subject to any disclaimer, the term of this patent is extended or adjusted under 35 U.S.C. 154(b) by 0 days.

(21) Appl. No.: 14/782,651

(22) PCT Filed: Apr. 10, 2014

(86) PCT No.: PCT/EP2014/057223
§ 371 (c)(1),
(2) Date: Oct. 6, 2015

(87) PCT Pub. No.: WO2014/167038
PCT Pub. Date: Oct. 16, 2014

(65) Prior Publication Data
US 2016/0090196 A1 Mar. 31, 2016

(30) Foreign Application Priority Data
Apr. 12, 2013 (FR) ...................................... 13 53323

(51) Int. Cl.
*B64C 1/14* (2006.01)
*B64D 47/08* (2006.01)
(Continued)

(52) U.S. Cl.
CPC ............ *B64D 47/08* (2013.01); *B64C 1/1407* (2013.01); *B64C 1/1423* (2013.01); *B64D 25/08* (2013.01);
(Continued)

(58) Field of Classification Search
CPC ....... B64C 1/14; B64C 1/1407; B64C 1/1415; B64C 1/1423; B64C 1/143; B64C 1/1438; B64C 1/1461; B64D 2011/0061
See application file for complete search history.

(56) References Cited

U.S. PATENT DOCUMENTS

| | | | | |
|---|---|---|---|---|
| 4,358,182 A | * | 11/1982 | Hayes | B64C 1/1492 244/129.3 |
| 4,816,828 A | * | 3/1989 | Feher | B64D 43/00 244/1 R |

(Continued)

FOREIGN PATENT DOCUMENTS

| | | |
|---|---|---|
| EP | 023473 | 8/1987 |
| EP | 0980828 | 2/2000 |

(Continued)

*Primary Examiner* — Tien Q Dinh
*Assistant Examiner* — Michael A. Fabula
(74) *Attorney, Agent, or Firm* — Defillo & Associates, Inc.; Evelyn A Defillo

(57) ABSTRACT

A system and method for displaying the external environment of the airplane. The system includes a camera mounted on the door of the airplane. The camera having lens for capturing the external environment illuminated by a illumination source in order to provide a video signal, and at least one display screen connected with the camera for receiving the video signal.

9 Claims, 5 Drawing Sheets

(51) Int. Cl.
    *B64D 45/00*   (2006.01)
    *H04N 7/18*    (2006.01)
    *B64D 25/08*   (2006.01)
    *H04N 5/225*   (2006.01)
    *H04N 5/33*    (2006.01)
    *B64D 25/14*   (2006.01)

(52) U.S. Cl.
    CPC ........... *B64D 45/00* (2013.01); *H04N 5/2256* (2013.01); *H04N 5/332* (2013.01); *H04N 7/183* (2013.01); *B64D 25/14* (2013.01)

(56) References Cited

U.S. PATENT DOCUMENTS

| | | | | |
|---|---|---|---|---|
| 4,843,461 A * | 6/1989 | Tatsumi | | H04N 7/186 348/156 |
| 5,253,051 A * | 10/1993 | McManigal | | H04N 7/183 348/121 |
| 6,052,056 A | 4/2000 | Burns et al. | | |
| 6,592,077 B2 * | 7/2003 | Uhlemann | | B64C 1/1492 244/129.3 |
| 6,831,680 B1 * | 12/2004 | Kumler | | B64D 45/0015 348/148 |
| 7,677,494 B2 * | 3/2010 | Yada | | B64C 1/143 14/71.1 |
| 9,234,813 B2 * | 1/2016 | Reitmann | | G01B 11/16 |
| 9,302,780 B2 * | 4/2016 | Zaneboni | | B64D 45/00 |
| 9,456,184 B2 * | 9/2016 | Barrou | | B64D 11/0015 |
| 2003/0095185 A1 * | 5/2003 | Naifeh | | H04N 7/185 348/156 |
| 2004/0061027 A1 * | 4/2004 | Movsesian | | B64C 1/1469 244/129.1 |
| 2004/0085450 A1 * | 5/2004 | Stuart | | H04N 7/186 348/156 |
| 2004/0144894 A1 * | 7/2004 | Paradis | | B64C 1/32 244/129.4 |
| 2004/0217234 A1 * | 11/2004 | Jones | | A61M 21/02 244/118.5 |
| 2004/0217976 A1 * | 11/2004 | Sanford | | A61M 21/02 345/619 |
| 2005/0007261 A1 * | 1/2005 | Berson | | G01C 23/00 340/945 |
| 2005/0007386 A1 * | 1/2005 | Berson | | G01C 23/00 345/633 |
| 2006/0156361 A1 * | 7/2006 | Wang | | H04N 7/186 725/105 |
| 2009/0195652 A1 * | 8/2009 | Gal | | B60R 1/00 348/148 |
| 2010/0188506 A1 * | 7/2010 | Dwyer | | H04N 7/18 348/144 |
| 2010/0294888 A1 * | 11/2010 | Texcier | | B64C 1/1407 244/129.5 |
| 2011/0042517 A1 * | 2/2011 | Depeige | | B64C 1/14 244/129.5 |
| 2011/0248514 A1 * | 10/2011 | Koneczny | | B64C 1/1407 292/58 |
| 2012/0154587 A1 * | 6/2012 | Hwang | | B60R 1/00 348/148 |
| 2012/0325962 A1 * | 12/2012 | Barron | | B64D 11/0015 244/118.5 |
| 2013/0169807 A1 * | 7/2013 | de Carvalho | | H04N 7/183 348/144 |
| 2013/0318873 A1 * | 12/2013 | Knijnenburg | | B64C 1/1407 49/31 |
| 2014/0092206 A1 * | 4/2014 | Boucourt | | B64D 47/08 348/36 |
| 2014/0160285 A1 * | 6/2014 | Barrou | | B64D 11/0015 348/144 |
| 2014/0176668 A1 * | 6/2014 | Boucourt | | B64D 45/0015 348/36 |
| 2014/0180508 A1 * | 6/2014 | Zaneboni | | B64D 45/00 701/14 |
| 2015/0292254 A1 * | 10/2015 | Bessettes | | B64C 1/1407 49/31 |
| 2015/0307208 A1 * | 10/2015 | Butler, III | | B64C 1/1407 348/144 |
| 2016/0019770 A1 * | 1/2016 | Bredemeier | | B64C 1/1423 244/129.5 |
| 2016/0107755 A1 * | 4/2016 | Bessettes | | B64C 1/1407 49/141 |
| 2016/0114895 A1 * | 4/2016 | Perrier | | B64C 1/1407 244/134 D |

FOREIGN PATENT DOCUMENTS

| | | |
|---|---|---|
| EP | 2495168 | 9/2012 |
| GB | 1290144 | 9/1972 |
| JP | 2002240798 | 8/2002 |

* cited by examiner

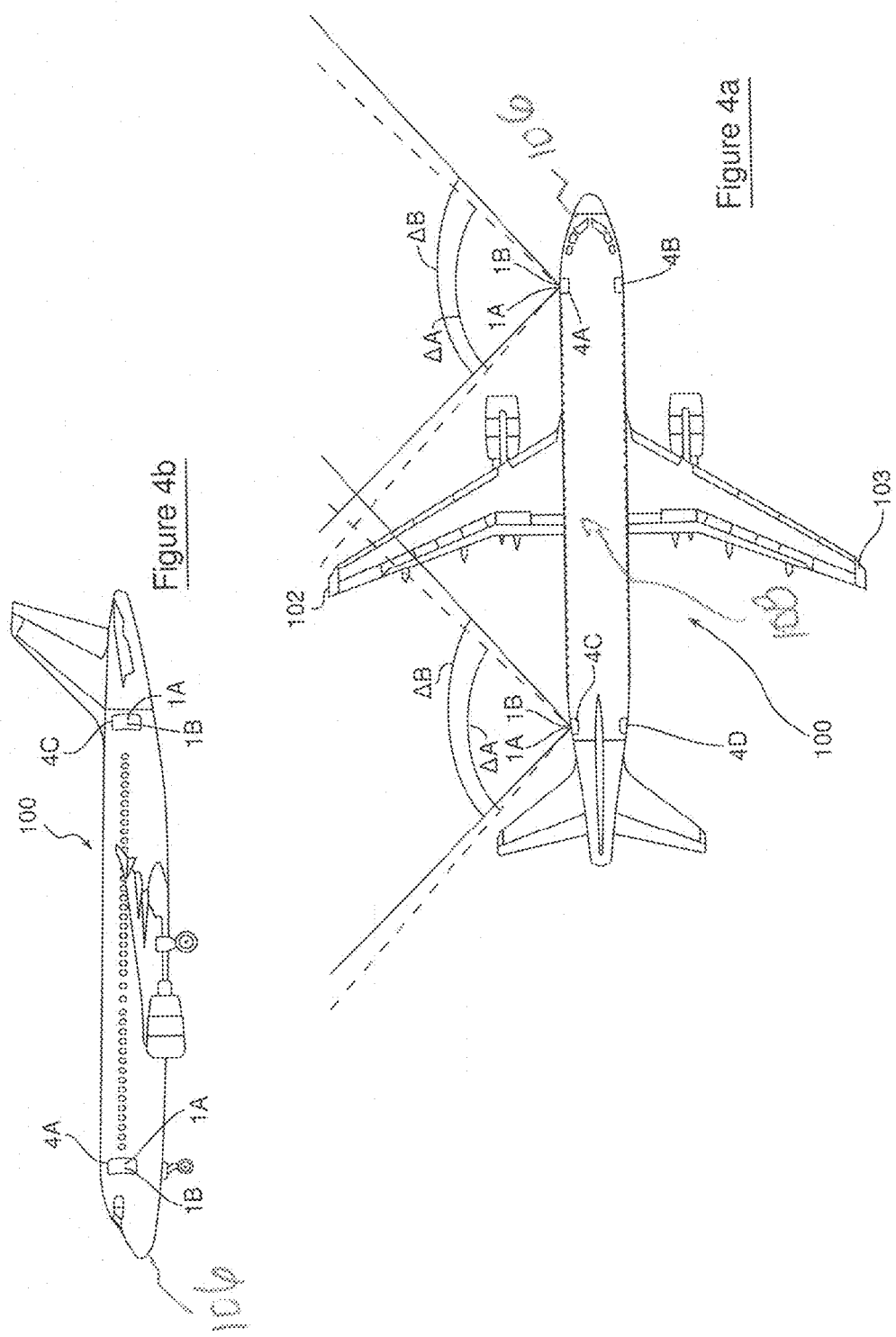

METHOD AND SYSTEM FOR DISPLAYING THE EXTERNAL ENVIRONMENT OF AN AIRCRAFT, AND AIRCRAFT DOOR EQUIPPED WITH SUCH A SYSTEM

CROSS REFERENCE TO RELATED APPLICATION

This application is a national stage entry of PCT/EP2014/057223 filed Apr. 10, 2014, under the International Convention claiming priority over French Patent Application No. 1353323 filed Apr. 12, 2013.

TECHNICAL FIELD OF THE INVENTION

The invention relates to a method and a system suitable for providing a display inside an airplane of the external environment of that airplane, and an airplane door equipped with this display system.

In emergency situations in which the passengers have to be evacuated to the ground, for example in the event of an airplane fire, it is a known practice to use escape slides, which are moored to the emergency exit doors or fuselage of the airplane. In order to ensure that the external conditions of the airplane make it possible to deploy the escape slide in total safety, a direct view of the immediate environment of the airplane is conventionally produced through a window by the crew of the airplane, an air hostess or an in-charge flight attendant.

Furthermore, the view of the environment close to the airplane is useful to avoid collisions on the ground, particularly at the wing ends when the airplane is pulled in reverse, for example in a parking zone, in a hanger for an overhaul or during maintenance.

Generally, a view of the environment of the airplane makes it possible to monitor the approaches and anticipate certain risks or avoid hazardous situations: for example, when taxiing on the taxiways, notably at intersections thereof, or when two airplanes cross on the same taxiway, when obstacles are present on the runway, objects or vehicles are present nearby, the environment is suspect, etc.

STATE OF THE ART

The size of a window dedicated to the external view results from a trade-off between the constraints associated with the placement of this window in a door or the fuselage of the airplane and the aperture of the field of view which results from this size.

It is also a known practice, for example from the patent document GB 1290144, to use a camera to film objects outside of an airplane through a window. In order to pick up the field outside the direct view axis, a prism provided with a 45° inclined reflecting surface can be used between the window and the camera. In order to increase the aperture of the observed field, the input and output surfaces of the prism are curved.

To observe the presence of ice or the presence of foreign bodies on the wings of an airplane, the patent document U.S. Pat. No. 6,052,056 describes also the transmission of a pulsed light to an optical sensor via an optical channel. When water, ice or a de-icing liquid covers the sensor, a variable quantity of pulsed light is reflected and strikes a photosensitive detector—for example photodiodes—after having returned through the optical channel. The photodiodes then provide a signal which varies as a function of the type of detection, in terms of nature and quantity.

These documents do not make it possible to address the problem of the display of the space which surrounds the airplane with a degree that is sufficient to provide a guarantee of observation (day/night display, poor weather conditions, etc.) both of the immediate environment of the airplane—in particular to accurately check the impact on the ground of the escape slides when they are deployed—and of the environment of the wing ends in order to be able to rectify the trajectory of the airplane in time, in case of a risk of collision.

SUMMARY OF THE INVENTION

The invention aims to produce such a display of the environment of the airplane by combining a direct shot and illumination in light radiation ranges appropriate to this environment, in conjunction with a display suitable for providing immediately usable information.

To this end, the object of the present invention is a method for displaying the external environment of an airplane and including replacing a window of the airplane by at least one opening produced in at least one door of the airplane, in mechanically coupling a lens of a camera, the camera transmitting a video signal in this opening, such that the lens directly picks up the light originating from said environment of the airplane. This environment is previously illuminated by zone with a directional lighting in at least one radiation range chosen as a function of display parameters of this environment. The method then includes transmitting the video signal supplied by the camera(s) to at least one display screen to provide comprehensive information from this signal. The comprehensive information relates to the state of operation of the equipment of the airplane, and to the display of safety zones surrounding the airplane whose lighting is adjusted as a function of said parameters.

Advantageously, the camera associated with the lighting makes it possible to measure the weather conditions over the visual range RVR (Runway Visual Range) of the pilot, particularly by targeting the end winglets in order to measure the RVR automatically and local to the airplane.

According to preferred embodiments:

the lighting parameters are set, between the infrared or visible radiation range, as a function of the weather conditions (day/night; poor conditions: mist, rain, etc.) of the environment and of the specific state of orientation of the airplane as established by a piloting center with which the airplane is equipped;

the radiation range is situated in the visible radiation spectrum when the solar radiation is above a determined threshold, particularly during the day, and the lighting is directed toward at least one passenger evacuation zone to guide the passengers and/or a zone surrounding the door(s) in order to facilitate maintenance activities;

the radiation range is situated in the near IR (infrared) radiation in order to provide a usable display when the solar radiation is below a determined threshold, in particular at night;

at least one double opening is produced in at least one door of the airplane, each opening being mechanically coupled to a camera lens so as to perform at least one video processing in three dimensions (3D) or enhanced 2D;

the 3D display is produced through each front door and each rear door of the airplane, to assess the position of the wing ends on the ground respectively when the aircraft moves forward and when the aircraft reverses, the distance relative to an obstacle, or another assessment relative to the environment of the airplane;

the video signal can also be transmitted to a display screen installed in the cockpit of the airplane and/or to the screens of a video system with which the passenger cabin is equipped, this video signal being able to be accompanied by complementary information (assessment of the distances to the obstacles, recognition of forms, etc.);

the screen or screens also displays/display information and/or alert messages linked to the state of operation of the equipment of the airplane, in particular the status of the door(s) (for example: locked, blocked or closed), the state of the escape slide arming/disarming system (nitrogen tank, etc.), the control mode of the camera and of the illumination (manual or automatic), and the state of the equipment for maintenance (state of the engine, state of the air conditioning system, etc.).

The invention relates also to a system for displaying the external environment of an airplane comprising a passenger cabin, a cockpit, wings and passenger and service doors, this system being intended to apply the method defined above. Such a system comprises at least one source of illumination for zones of said environment in at least one radiation range, at least one video camera provided with a lens suitable for picking up a set of light rays originating directly from the external environment illuminated by the source to provide a video signal corresponding to said environment, and at least one display screen linked with the camera to receive the video signal. The camera, the illumination source and the display screen are linked to a controller suitable for receiving information on the state of operation of the equipment of the airplane and display parameters of said environment.

According to preferred embodiments:

at least one illumination zone surrounds an impact zone of the airplane escape slide determined by the controller, this zone remaining displayed on the screen by inclusion in the controller of the state of orientation of the essential structures of the airplane, for example of the landing gear, of the fuselage and of the engine pods;

the illumination source or illuminator includes of light-emitting diodes or LEDs for lighting in the visible or infrared radiation range, arranged in a housing to light a zone that is sufficiently wide surrounding the impact zone of an escape slide of an airplane door;

a 3D display is produced by a pair of cameras through a front door and a rear door of the airplane, to assess the position of the airplane relative to its environment during maneuvers on the ground, in particular to assess the position of the wing ends respectively when the airplane moves forward and when the airplane reverses;

the video signal can also be transmitted to a display screen installed in the cockpit of the airplane and/or to the screens of a video system with which the passenger cabin is equipped.

Another subject of the present invention is an airplane door, namely passenger door or service door, comprising a locking system and a door opening/closing system by an articulation arm. This door is equipped with the display system defined above comprising at least one HD video camera.

Preferably, the controller of the display system is also intended to drive and coordinate the movements of the articulation arm of the door via an assisted mechanical drive or an electric drive motor.

Advantageously, the illuminator consists of an LED lighting assembly, advantageously arranged in proximity to the door, and the camera(s) and the display screen are installed on the door, preferably substantially in the middle of the door.

BRIEF DESCRIPTION OF THE DRAWINGS

Other features and advantages of the invention will emerge on reading the following description which relates to an exemplary embodiment, with reference to the attached figures which illustrate.

DETAILED DESCRIPTION OF THE INVENTION

Figure 1A:
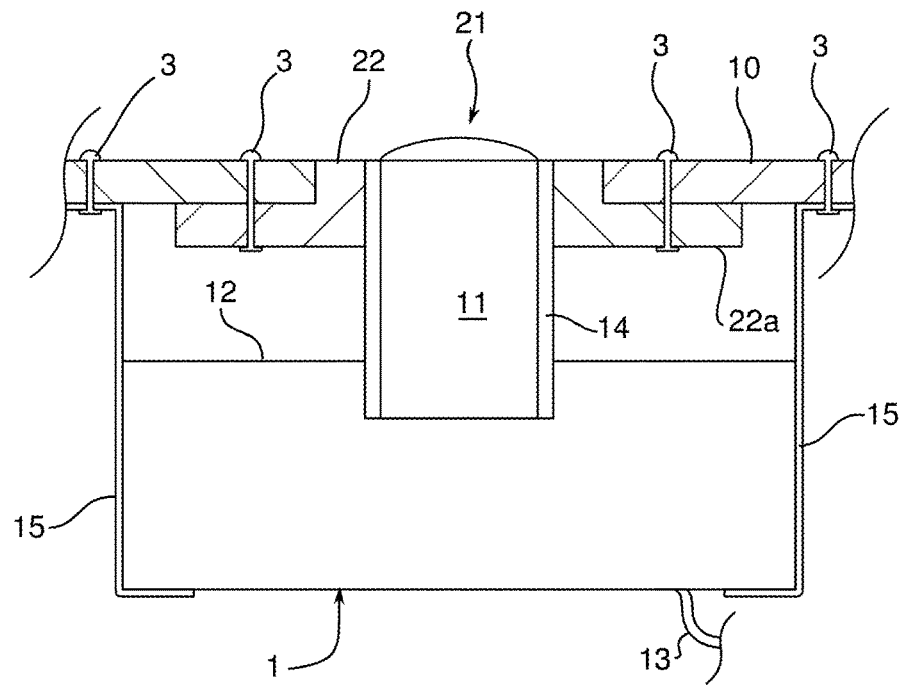
FIGS. 1a and 1b, cross-sectional views of two examples of fixing of the lens of a video camera through an airplane door.

Referring to the cross-sectional view of FIG. 1a, the HD (high definition) video camera 1 of an exemplary display system according to the invention comprises a lens 11 and an electronic housing 12 containing a charge coupled photosensitive sensor (CCD) 12b linked with a collector or, alternatively, a CMOS sensor, this photosensitive sensor 12b being coupled to a signal convertor. At the camera output, a cable 13 makes it possible to transmit an HD video signal to a display screen (see FIG. 2).

The lens 11 is fixed in a circular opening 21 on a passenger door of the airplane (not represented). The opening 21 was previously produced by cutting the skin of the fuselage 10. A cylindrical framing 22 of the same material as the skin 10—here of composite material—is provided to receive the lens 11 clad in a matching ring 14. Alternatively, the framing can be formed in a different material from that of the skin, for example aluminum.

The framing 22 has a widened portion 22a passed through by rivets 3 for fixing (or other fixing means: screws, etc.) to the skin 10. The ring 14 and the framing 22 are joined together via a coupling of thread/tapping type or equivalent (snap fitting, seal, etc.). Furthermore, the electronic housing 12 is advantageously fixed to the skin 10 by lateral ties 15.

Figure 1B:
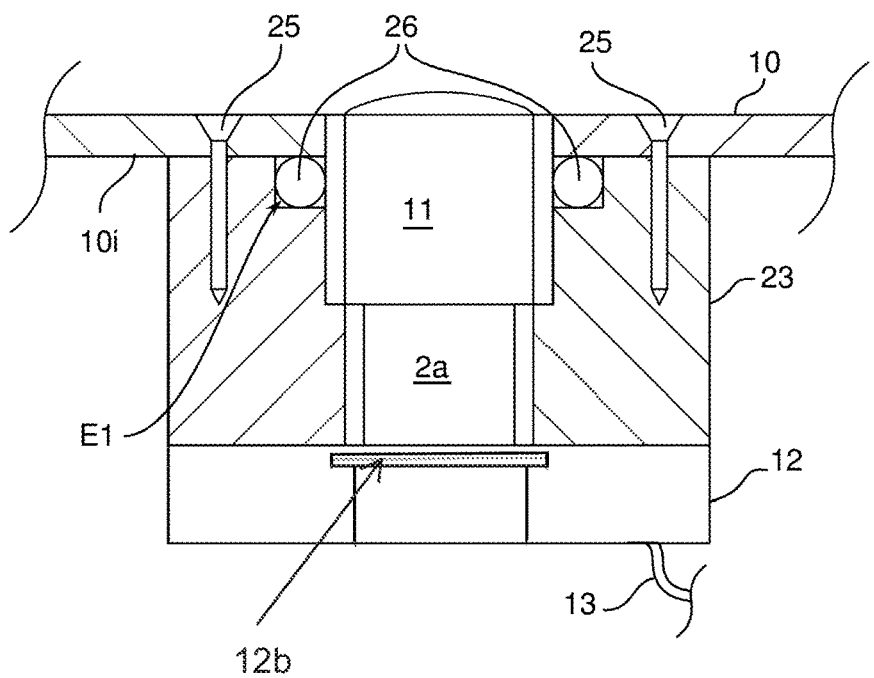

As a variant, as illustrated by FIG. 1b which denotes the elements that are identical or equivalent in FIG. 1a by the same reference symbols, the framing 22 is replaced by a housing 23. This housing 23 is passed through by a bore 2a suitable for housing the lens 11. The coupling between the lens 11 and the skin 10 is of the same type as the coupling between the lens 11 and the framing 22 of FIG. 1.

Moreover, the housing 23 bears peripherally against the inner face 10i of the skin 10 and is fixed to this skin 10 by appropriate screws 25. An o-ring seal 26 is housed in a space E1 formed between the housing 23 and the skin 10 to produce a seal-tight link between the housing 23 and the skin 10.

Figure 2:
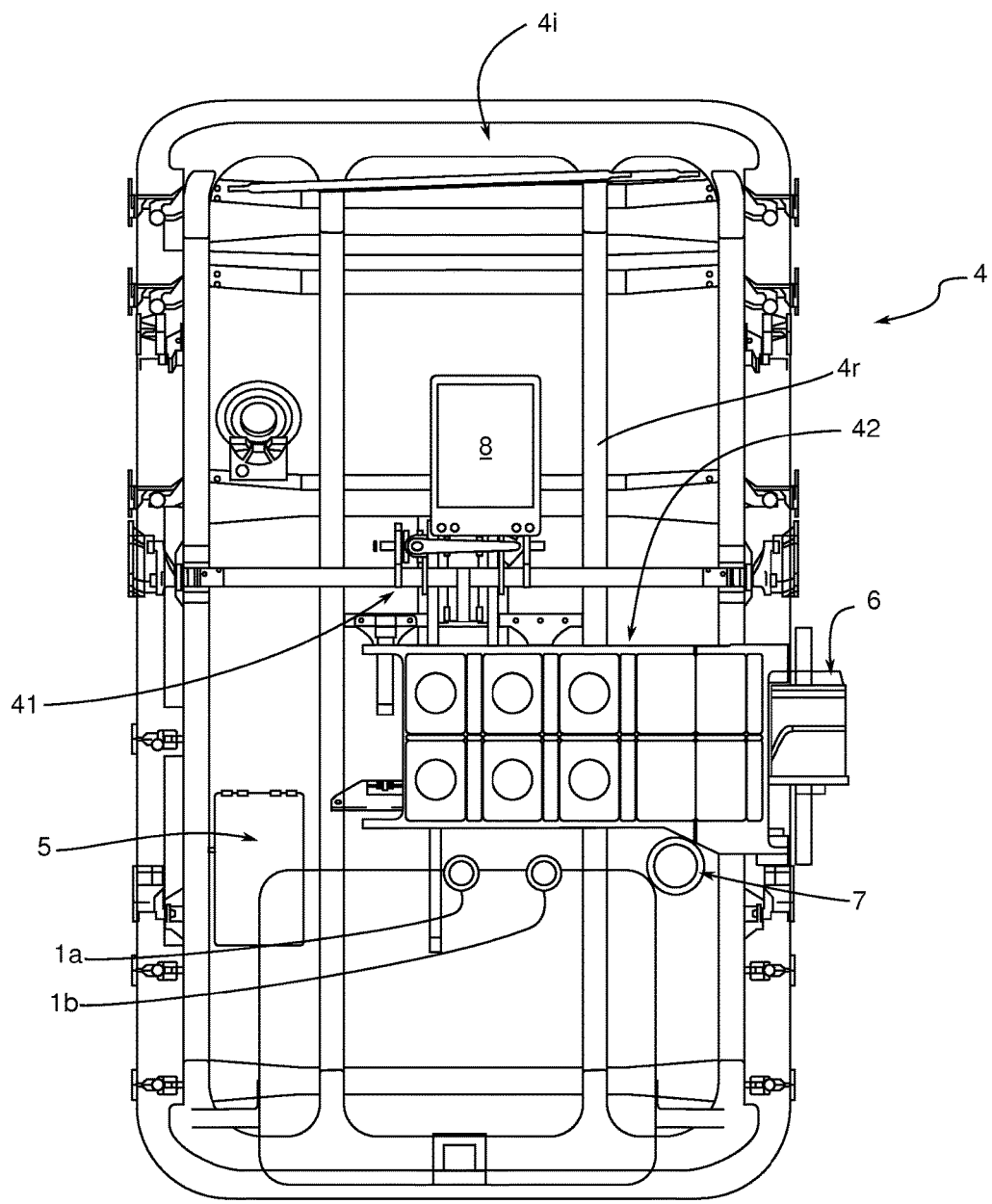
FIG. 2, a front view of the internal face of an exemplary passenger door equipped with two cameras, an IR/visible illuminator and a display screen.

Referring to the front view of FIG. 2, the inner face 4i of an exemplary passenger door 4, equipped with two cameras 1A and 1B, an IR/visible illuminator 7 and a display screen 8, is illustrated. The structure of the door 4 consists of a skin 10 reinforced by stiffeners 4r in the case where—as in the example illustrated the thickness of the door 4 is too thin to ensure sufficient rigidity. In other embodiments, the door of sufficient thickness may be rigid in itself and not require the reinforcement.

The passenger door 4 comprises a locking system with safety latch 41, a door opening/closing system by an articulation arm 42, and a door controller 5 intended to drive and coordinate the movements of the door 4. The controller 5 also drives and coordinates the movements of the articulation arm of the door 42 by an electric drive motor 6.

This door 4 is equipped with two HD display video cameras 1a and 1b, each camera being arranged in the manner described above through door openings 21. The cameras and the display screen are installed substantially in the middle of the door, the cameras 1a and 1b under the arm 42 and the screen 8 above the arm 42.

The distance between the cameras 1a and 1b is computed so as to allow the processing of the HD video signals in three-dimensional (3D) mode by the controller 5. Such processing makes it possible to accurately measure the distances between objects, in particular between the ends of the wings and the surrounding structures as explained later in conjunction with FIG. 4a.

The display screen 8 also displays information and/or alert messages in conjunction with the state of operation of the equipment of the airplane, namely: the status of the doors—locked, blocked or closed—, the state of the escape slide arming/disarming system, nitrogen tank level, the control mode of the camera and of the illumination—manual or automatic—and the maintenance (state of the engine, of the roll/pitch detection system, state of operation of the weather sensor) and equivalent.

Figure 2A:
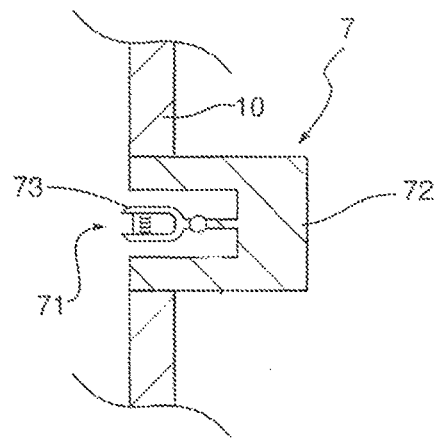
FIG. 2a, a lateral cross-sectional view of the illuminator.

An illuminator 7, consisting of an LED housing 71 and a support bushing 72, is arranged through the door 4, as shown by the lateral cross-sectional view of FIG. 2a. The support bushing 72 is of cylindrical form to be fitted and fixed in a corresponding opening formed in the skin 10 of the door 4, in a manner similar to the camera lens.

The LED housing 71 forms a directional lighting part through the presence of a cover with variable angular aperture 73 which channels the radiation toward a zone of the external environment. This part 71 is coupled to the support bushing 72.

The illuminator 7 is arranged in the door 4 (FIG. 2). The LEDs can operate in two lighting radiation ranges, covering the visible range and the IR range. The roll/pitch data are supplied to the controller 5 from a piloting center through appropriate cabling in order to retain the framing of the escape slide impact zone (see below). The controller 5 automatically activates the radiation of the lighting in the infrared range—as long as the airplane is moving on the ground (to allow the crew to correctly display the external conditions)—then in the visible as soon as the door is open (to light the escape path for the passengers on the escape slide).

Figure 3:
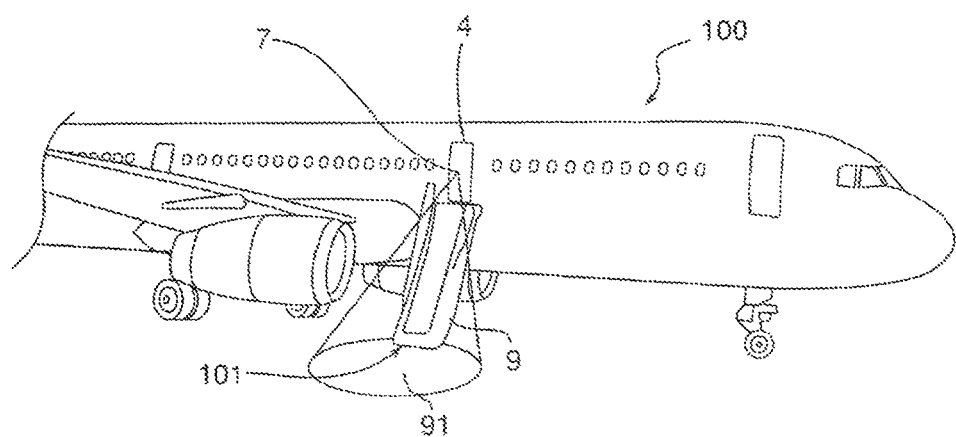
FIG. 3, a perspective view of an airplane environment illustrating the range of the light radiation from the illuminator on the impact on the ground of a deployed escape slide.

FIG. 3 more specifically illustrates an airplane environment 100 when an escape slide 9 is deployed for an evacuation of the passengers from the door 4. The range of the illuminator 7 makes it possible to light an evacuation zone 91 that is sufficiently wide to surround the impact zone on the ground 101 of the escape slide 9.

Figure 3A:
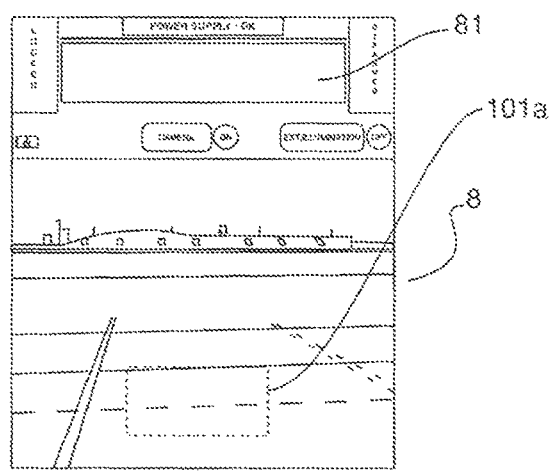
FIG. 3a, a display screen showing the shot taken by the camera with, in particular, the display of the impact zone of the escape slide on the ground, FIGS. 4a and 4b, a top view and a side view of an airplane whose doors are equipped with two 3D display cameras.

The illuminated zone 91 makes it possible to target the impact zone 101 and retain the display 101a of this zone on the screen 8, as represented in FIG. 3a. On this screen 8, the image also comprises a dashboard 81 which provides the main safety information: door closure state, cabin pressurization state, external illumination state, escape slide disarming state, etc.

When the visibility conditions are correct, particularly in daytime, the radiation range of the illuminator 7 is in the visible and the lighting remains directed toward the evacuation zone of the passengers 91 to guide them. Advantageously, a zone surrounding the door 4 is lit by the illuminator 7 in order to facilitate maintenance activities.

The radiation range is situated in the near IR (infrared) radiation in order to provide a usable display when the visibility conditions of the environment do not allow sufficient visibility in the visible radiation range. Thus, the radiation range is chosen by the controller 5 as a function of the display parameters conventionally: sharpness, contrast, brightness—which defines the conditions of visibility.

FIGS. 4a and 4b respectively illustrate a top view and a side view of the airplane 100 whose doors 4A to 4D are each equipped with two high definition (HD) 3D display cameras 1A and 1B, each camera being identical to the camera 1 of FIG. 1. Thus, as described previously with reference to FIG. 2, the lenses 11 of the cameras 1A, 1B of a same door are mounted through openings 21 at a distance that makes it possible to produce, by virtue of the computer, the HD 3D display by a processing of the video signals, in order to determine the distances, notably in depth, which would not be possible with a single camera.

The HD 3D display is thus produced by each pair of cameras 1A, 1B through a double opening of each of the front doors 4A and 4B and each of the rear doors 4C and 4D of the airplane, with wide angular apertures $\Delta A$ and $\Delta B$, the rear cameras being directed in the example illustrated so as to be able to also display the wing ends 102 and 103. The position of the wing ends 102 and 103 is thus assessed on the ground, respectively when the airplane moves forward and when the airplane reverses, through the processing of the video signals by the controller 5 (FIG. 2) and provided by the cameras 1A, 1B.

Figure 5:
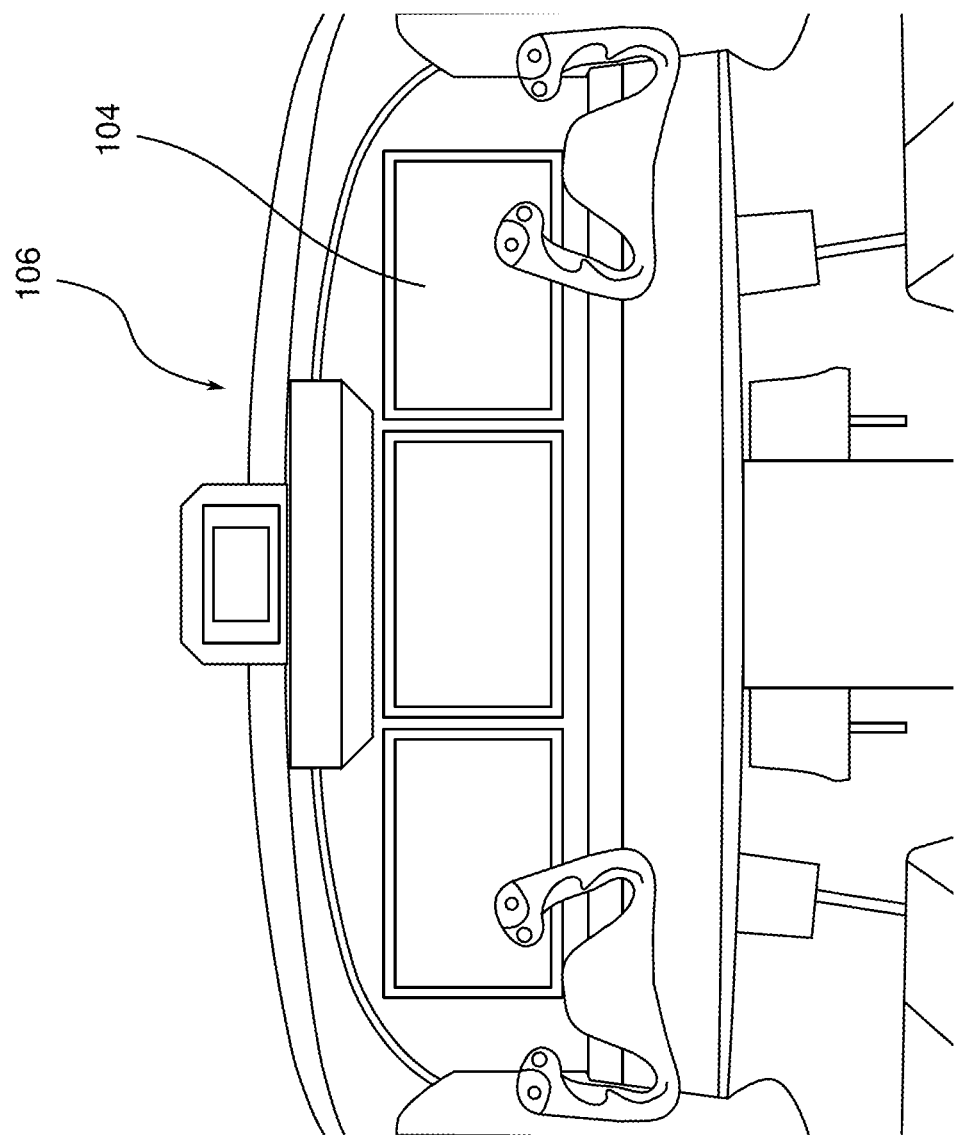
FIG. 5 is a front view of the inside of the cockpit of the airplane showing a display screen.

The invention is not limited to the examples described and represented. In particular, the video signal(s) can also be transmitted to a display screen 104 installed in the cockpit 106 of the airplane (See FIG. 5) and/or to the screens of a video system with which the passenger cabin 108 is equipped.

Furthermore, the 3D display can be useful when the airplane is required to perform more complex maneuvers on the ground, for example when it has to negotiate turns. The use of two cameras per door can also be useful for the airplane transmission in case of failure of the electronic equipment.

The 3D display can be replaced by a 2D display enhanced by an indication of the depth by a suitable symbol system, for example a color code or equivalent on the display screen.

Advantageously, the display system according to the invention can be used equally in emergency door opening conditions and in nominal operation, for example to detect the presence of a walkway or of an operator working facing the door.

Moreover, the screen(s) also displays/display information and/or alert messages in conjunction with the state of operation of the equipment of the airplane chosen from the status of the door(s) (for example: locked, blocked or closed), the status of the escape slide arming/disarming system (nitrogen tank, etc.), the control mode of the camera and of the illumination (manual or automatic) and/or maintenance (state of the engine, of the detection system, etc.).

The invention claimed is:

1. A method for displaying an external environment of an airplane (100), the method comprising the steps of:
introducing into an opening on at least one passenger or service door of the airplane a camera, the camera including a lens (11) and an electronic housing having a photosensitive sensor for determining an exterior visibility condition, the photosensitive sensor is linked to a controller by a cable, the camera transmits a video signal, from said external environment of the airplane (100),
illuminating the external environment by using an illuminator having an array of light emitting diodes capable of emitting a visible wavelength light source and/or an infrared wavelength light source, and
transmitting the video signal supplied by the camera to at least one display screen (8) located at the at least one passenger or service door and at a cockpit of the airplane, the video signal provides an information relating to the external environment of the airplane including at least one passenger evacuation zone, the display screen also receives information about status of operational equipments of the airplane including: status of doors, status of escape slides (9), status of a door locking system, status of the camera, status of the illuminator, and status of maintenance equipment of the airplane.

2. The method according to claim 1, wherein the light source of the illuminator is the visible wavelength source during the day, and the illuminator is directed toward the at least one passenger evacuation zone (91).

3. The method according to claim 1, wherein the light source is the infrared wavelength source at night time.

4. The method according to claim 1, further including a second opening in the at least one door (4A to 4D) of the airplane, and including the step of placing a second camera—into the second opening, the first camera and the second camera are located on the same door and are also connected to—a video processing device for producing a three dimensional (3D) video.

5. An airplane including:
a passenger cabin,
a cockpit,
wings,
at least one of passenger doors and a service door,
an escape slide located next to each door,
at least one of the doors including at least one opening, and
a display system comprising:
a camera located in each opening of the at least one door, each camera including:
a lens, and
an electronic housing including:
a photosensitive sensor for determining an exterior visibility condition, the photosensitive sensor being linked to a controller by a cable, the camera transmitting a video signal from said external environment of the airplane,
at least one illuminator to illuminate the external environment of the airplane, each illuminator including:
an array of light emitting diodes capable of emitting a visible wavelength light source and/or an infrared wavelength light source, wherein the light source is chosen depending on lighting conditions of the external environment, and
a display screen located at least in one of the doors of the passenger cabin or in the cockpit,
wherein each camera transmits a video signal to at least one display screen (8), the video signal provides an information relating to the external environment of the airplane including at least one impact zone of an escape slide, the display screen also receives information about the status of operational equipment of the airplane including the status of the doors, status of escape slides (9), status of a door locking system, status of at least one camera, status of the at least one illuminator, and status of maintenance equipment of the airplane,
wherein at least one illumination zone (91) of the at least one illuminator surrounds the impact zone (101) of each escape slide (9) of the airplane, wherein the illumination is controlled by the photosensitive sensor that is linked to the controller.

6. The display system according to claim 5, wherein the light-emitting diodes are arranged in a housing (71).

7. The display system according to claim 5, further including a second opening in the at least one door of the airplane and a second camera is placed on the second opening, the first camera and the second camera are located on the same door and are also connected to a video processing device for producing a three dimensional (3D) video.

8. The airplane according to claim 5, further comprising:
a locking system including:
a safety latch (41), and
an articulation arm (42),
wherein the controller (5) is programmed to control the articulation arm (42) by using a motor (6).

9. The airplane according to claim 8, wherein the light-emitting diodes are arranged near each door.

* * * * *